(12) United States Patent
Tyudina et al.

(10) Patent No.: US 12,711,714 B2
(45) Date of Patent: Aug. 18, 2026

(54) PLACEMENT OF 3D VISUAL APPEARANCE IN EXTENDED REALITY COMMUNICATIONS

(71) Applicant: Telefonaktiebolaget LM Ericsson (publ), Stockholm (SE)

(72) Inventors: Natalya Tyudina, Aachen (DE); Ali El Essaili, Aachen (DE); Esra Akan, Aachen (DE); Joerg Christian Ewert, Aachen (DE); Ola Melander, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 18/569,668

(22) PCT Filed: Jun. 25, 2021

(86) PCT No.: PCT/EP2021/067525
§ 371 (c)(1),
(2) Date: Dec. 13, 2023

(87) PCT Pub. No.: WO2022/268339
PCT Pub. Date: Dec. 29, 2022

(65) Prior Publication Data
US 2024/0386677 A1 Nov. 21, 2024

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G06V 10/761* (2022.01); *G06V 20/20* (2022.01);
(Continued)

(58) Field of Classification Search
CPC ..................... G06T 19/006; G06T 7/70; G06T 2207/30196; G06V 10/761; G06V 20/20; H04L 12/1813; H04N 7/157
See application file for complete search history.

(56) References Cited

U.S. PATENT DOCUMENTS 10,901,215 B1 1/2021 Newcombe et al.
2016/0150217 A1* 5/2016 Popov .................. H04N 13/257 348/47

(Continued)

OTHER PUBLICATIONS

International Search Report and Written Opinion of the International Searching Authority, PCT/EP2021/067525, mailed Mar. 22, 2022, 23 pages.

(Continued)

*Primary Examiner* — Grace Q Li
(74) *Attorney, Agent, or Firm* — Sage Patent Group

(57) ABSTRACT

The invention relates to a method for processing 3D image data streams including at a processing entity in an audio-visual conferencing scenario:

receiving, from an extended reality device, a first 3D image data stream representing a field of view of a first participant wearing the extended reality device,
receiving a position of the extended reality device,
receiving a second 3D image data stream representing at least one human representing at least a second participant,
identifying first objects represented in the first 3D image data stream,
identifying second objects represented in the second 3D image data stream,
determining similarities between the first objects and the second objects, (Continued)

determining at least one forbidden area in the field of view of the first 3D image data stream, where a placement of a visual appearance of the human is to be avoided.

20 Claims, 9 Drawing Sheets

(51) Int. Cl.
*G06V 10/74* (2022.01)
*G06V 20/20* (2022.01)
*H04L 12/18* (2006.01)

(52) U.S. Cl.
CPC *H04L 12/1813* (2013.01); *G06T 2207/30196* (2013.01)

(56) References Cited

U.S. PATENT DOCUMENTS

2016/0350973 A1 12/2016 Shapira et al.
2019/0041982 A1* 2/2019 Kühne .................... G06F 3/011
2019/0188895 A1* 6/2019 Miller, IV .............. H04N 7/157
2020/0349751 A1* 11/2020 Bentovim ................ G09B 5/06
2022/0049930 A1* 2/2022 Toy ........................... F41G 3/26
2022/0415197 A1* 12/2022 Haddish ................ G06F 3/0346

OTHER PUBLICATIONS

3GPP TR 26.928 V16.0.0 (Mar. 2020); 3rd Generation Partnership Project; Technical Specification Group Services and System Aspects; Extended Reality (XR) in 5G (Release 16), 131 pages.
Magic Leap, Inc., "What is Spatial Mapping?" downloaded from the Internet on Jun. 30, 2021 from: https://www.magicleap.com/en-us/privacy/spatial-mapping-overview-and-detail-options, 6 pages.
Unity3d, "Unity—Manual: Colliders," Unity User Manual 2020.3 (LTS); downloaded from the Internet on Jun. 30, 2021 from: https://docs.unity3d.com/Manual/CollidersOverview.html, 7 pages.
Google, "Working with anchors," downloaded from the Internet on Jun. 30, 2021 from: https://developers.google.com/ar/develop/developer-guides/anchors, 4 pages.

* cited by examiner

PLACEMENT OF 3D VISUAL APPEARANCE IN EXTENDED REALITY COMMUNICATIONS

CROSS REFERENCE TO RELATED APPLICATIONS

This application is a 35 U.S.C. § 371 national stage application of PCT International Application No. PCT/EP2021/067525 filed on Jun. 25, 2021, the disclosure and content of which is incorporated by reference herein in its entirety.

TECHNICAL FIELD

The present application case to a method for processing 3D image data streams and the corresponding entity configured to process the 3D image data streams. Furthermore a computer program comprising program code and a carrier comprising the computer program is provided.

BACKGROUND

Recently, the importance of remote meetings and virtual communications has grown rapidly. In this context, point clouds or any 3D image data stream are streamed from depth cameras to an XR (extended Reality) device, such as augmented reality (AR), mixed reality (MR) or Virtual reality (VR) devices. Point clouds (e.g. 3D image frames) are captured by depth cameras such as Intel Realsense or Microsoft Kinect. Recent smartphones and tablets are equipped with Lidar sensors that can capture 3D image frames.

Meshes, textures, and UV maps are commonly used to represent captured 3D content. Mesh is a data structure that defines the shape of an object in AR/VR. There are different mesh topology types e.g. triangle, line or point meshes. A type indicates the way the mesh surface is created using triangulation, points, or lines, where each line is composed of two vertex indices and so on. Meshes contain edges and vertices to define the shape of a 3D object.

UV mapping is a 3D modeling process of projecting a 2D image to a 3D model's surface for texture mapping. With UV mapping it is possible to add color to the polygons that make up a 3D object. The UV mapping process involves assigning pixels in the image to surface mappings on the polygon. The rendering computation uses the UV texture coordinates to determine how to paint the three-dimensional surface.

Texture is a digital 2D picture of the object (also referred to as RGB image). The combination of mesh, texture and UVs creates a 3D representation of a scene represented in the 3D image stream. By extracting a human from the mesh and texture and applying UVs it is possible to create a 3D representation of the human which can be captured from different angles. Other formats for generating 3D representations can be considered such as geometric point clouds, RGB plus depth, etc.

In the following communications in an extended Reality (XR) space are considered, where participants wearing XR devices are able to communicate and interact in a 3D environment. By way of example a person represented virtually as a hologram or 3D virtual representation is projected on the augmented reality (AR) glasses of a real person. The two persons can participate in an AR conversational service with immersive audio-visual experience.

For the placement of a hologram one of two approaches may be used:

- Placement of a hologram or 3D object in place without considering the environment.
- Placement of a hologram or 3D object in or on a detect plane using collusion mechanism. An object can be placed only when the object has a collision with a flat plane, or anchor.

Computer vision algorithms use images collected from cameras on XR devices to extract features from those images. These features are then compared to previously stored features and merged to create one set of features that represent the surroundings.

There are different types of spatial mapping such as dense mesh data and planes.

- Dense Mesh Data: Dense mesh data is a triangular geometry that closely approximates the structure of the visible walls and objects in the surrounding, such as furniture.
- Planes: From dense mesh data, large flat surfaces or planes can be derived. This helps to identify walls, floors, and optimal surfaces for placing content. Dense mesh data and planes additionally enable occlusion and collision consistent with your environment.

The way game engines such as Unity map real-world surfaces and understands them is through three components: the Surface Observer, the Spatial Mapping Collider, and the Spatial Mapping Renderer.

The Surface-Observer checks with Unity's mapping system changes in the environment and coordinates any changes with the Collider and Renderer. In a way, the Surface-Observer acts as Unity's eyes to the physical space.

When a new surface or object is detected by the Surface-Observer, Unity's mesh is updated to incorporate it through a process called "baking." When an object is baked, the mesh reconfirms around it. In essence, a virtual object is made to take the place of the physical object. Unity can recognize the virtual object internally, while to the eyes of the user it appears Unity is recognizing the physical object.

To simulate the physicality of this object, any freshly baked object is made with a mesh filter and a mesh collider. The mesh filter determines what the object looks like, and the mesh collider helps to define the object's shape so raycasts are able to collide with it. This process is handled by Unity's Spatial Mapping Collider. This system is responsible for updating the mesh, and tracking where these baked objects are located in space. It can adjust the mesh to have high-resolution to acknowledge the very intricate shape of a table. Or, it can adjust the mesh to a low-resolution, so the general rectangle shape of a table is acknowledged.

Anchors ensure that objects appear to stay at the same position and orientation in space, helping you maintain the illusion of virtual objects placed in the real world.

The approaches discussed above are convenient for static environment but have challenges with 3D conferencing use-cases and a mobile AR environment. Accordingly a need exists to overcome the problems mentioned above and to improve different use cases where a visual appearance of a human is added to an XR device.

SUMMARY

This need is met by the features of the independent claims. Further aspects are described in the dependent claims.

According to a first aspect a method for operating a processing entity is provided.

According to a first aspect a method for processing a 3D image data stream is provided where in the following steps are carried out at a processing entity in an audio visual conferencing scenario:

- the processing entity receives from an extended reality device a first 3D image data stream representing a field of view of a first participant wearing the extended reality device. Furthermore, a position of the extended reality device is received and a second 3D image data stream is received representing at least one human corresponding to at least a second participant of the conferencing scenario. In the first 3D image data stream first objects are identified and in the second 3D image data stream second objects are identified. Furthermore, similarities are determined between the first objects and the second objects. In addition, at least one forbidden area is determined in the field of view of the first 3D image data stream where a placement of a visual appearance of the human is to be avoided. Furthermore, a position of a visual appearance of the human in the first 3D image data stream is determined taking into account the similarities, the at least one forbidden area and the position of the extended reality device. The determined position of the visual appearance is then transmitted over a communication network to the extended reality device where the visual appearance is to be included into the field of view of the first participant.

Furthermore, the corresponding processing entity is provided configured to operate as discussed above or as discussed in further detail below.

The processing entity can comprise a first module configured to receive the first 3D image data stream from the extended reality device. The processing entity can include a second module configured to receive a position of the extended reality device and a third module configured to receive a second 3D image data stream representing at least one human as second participant. The processing entity can include a further, a fourth module, configured to identify first objects represented in the first 3D image data stream. The processing entity can include a fifth module configured to identify second objects represented in the second 3D image data stream. A sixth module may be provided configured to determine similarities between the first objects and the second objects. A seventh module can determine at least one forbidden area in the field of view of the first 3D image data stream where a placement of the visual appearance of the human is to be avoided. An additional module, module number eight may be configured to determine a position of the visual appearance of the human in the first 3D image data stream taking into account the similarities, the at least one forbidden area, and the position of the extended reality device. A ninth module is configured to transmit the determined position of the visual appearance over a communication network to the extended reality device where the visual appearance is to be included into the field of view of the first participant.

Using the understanding of the objects provided in the two data streams and based on forbidden areas for the placement of the visual representation it is possible to place the visual representation of a human in an extended reality device in such a way that the user of the extended reality device can communicate with the visual representation of the other participant in a natural way as the positioning of the visual appearance in a place considered unnatural by the user is avoided. The other participant is included at a position which is considered as suitable for the user wearing the extended reality device.

Furthermore, a computer program is provided comprising program code, wherein execution of the program code causes at least one processing unit of the processing entity to execute a method as discussed above or as explained in further detail below.

Furthermore, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF DRAWINGS

The foregoing and additional features and effects of the application will become apparent from the following detailed description when read in conjunction with the accompanying drawings in which like reference numerals refer to like elements.

DETAILED DESCRIPTION

Figures 1, 2:
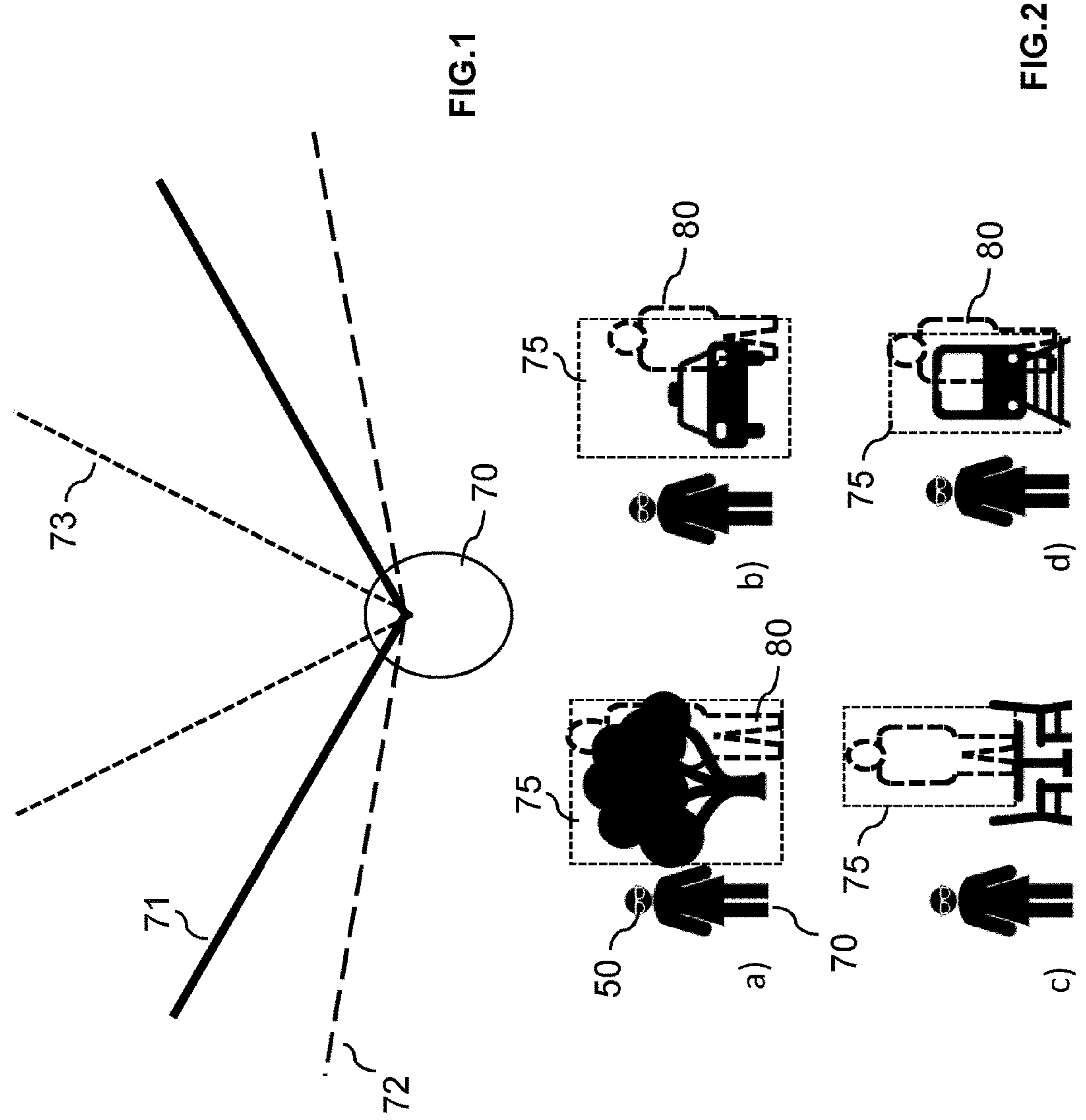
FIG. 1 shows a schematic view of a field of view of a human, relative to a field of view of an extended reality device.
FIG. 2 shows schematic examples of incorrect placement of a visual appearance of the human in an environment as seen by a user of an extended reality device.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may be implemented by an indirect connection or coupling. Functional blocks may be implemented in hardware, software, firmware, or a combination thereof.

Within the context of the present application, the term mobile entity or user equipment, UE, refers to a device for instance used by a person, a user, for his or her personal communication. It can be a telephone type of device, cellular telephone, mobile station, a cordless phone or a personal digital assistant type of device like laptop, notebook, notepad or tablet equipped with a wireless data connection. The UE may be equipped with a subscriber identity module, SIM, or electronic SIM comprising unique identities such as the IMSI, International Mobile Subscriber Identity, TMSI, Temporary Mobile Subscriber Identity, or GUTI, Globally Unique Temporary UE Identity, associated with the user using the UE. The presence of a SIM within the UE customizes the UE uniquely with a subscription of the user.

For the sake of clarity, it is noted that there is a difference but also a tight connection between a user and a subscriber. The user gets access to the network by acquiring a subscription to the network and by that becomes a subscriber within the network. The network then recognizes the subscriber, by way of example using the IMSI, TMSI or GUTI or the like and uses the associated subscription to identify related subscription data. A user can be the actual user of the UE entity and the user may also be the one owning the subscription, but the user and the owner of the subscription may also be different.

The solution discussed below is solving the problems of placement of a 3D visual appearance in an extended reality (XR) device, by way of example for conferencing applications for a static or mobile user wearing the extended reality device which is called the first participant in the conferencing scenario. The first participant is talking to a second participant, wherein the visual appearance of the second participant is included into the field of view of the first participant who is wearing the XR device. The solution below can take into account obstacles and the real environment for a safe and secure conferencing, and the visual appearance is placed in the context of the scene. Furthermore, the visual appearance can be placed relative to a moving person wearing the XR device. Furthermore the natural field of views are taken into consideration.

FIG. 1 shows a human binocular field of view 71 of a user 70 and the peripheral field of view adds additional 35° to both sides resulting in an enlarged field of view 72. In the binocular field of view a human can see the colors and can focus clearly. In the peripheral or enlarged view the user can see action, the colors are blurred and objects are not in focus. An XR device may have a smaller field a view between 50 and 60° such as the field of view 73 shown in FIG. 1.

FIG. 2 shows different examples of how a visual appearance 80 of a human is placed in the field of view of a user 70 wearing the extended reality device 50 if the environment of the user 70 is not taking into account. In the examples shown the environment has different forbidden areas 75 where a placement of a human in the field of view of the user 70 is inappropriate. The problems shown in FIG. 2 can procure when the objects present in the field of view of the user 70 are not recognized.

Figure 3:
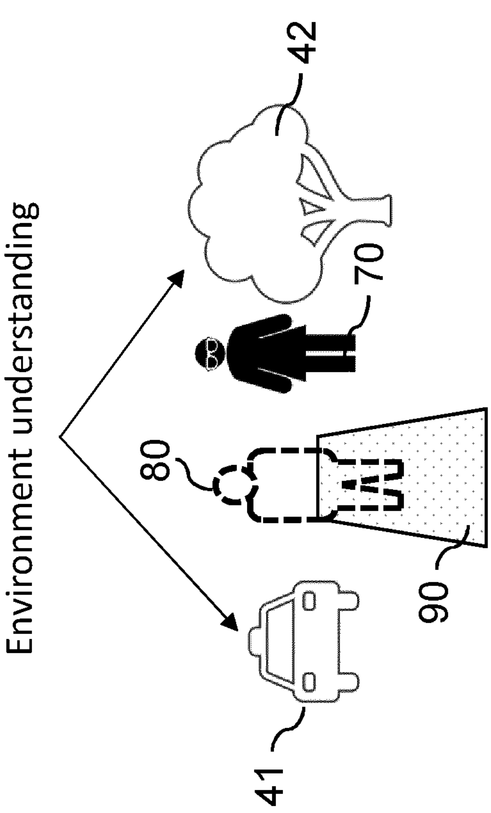
FIG. 3 shows a schematic example of a correct placement of a visual appearance of a human in the environment as seen by a user of an extended reality device.

FIG. 3 shows an example where different objects 41 or 42 present in the field of view of the user 70 are recognized so that it is possible to correctly place the visual appearance 80 at a position which is considered appropriate for the user 70. A target plane 90 could be identified which is appropriate to place the visual appearance on.

Figure 4:
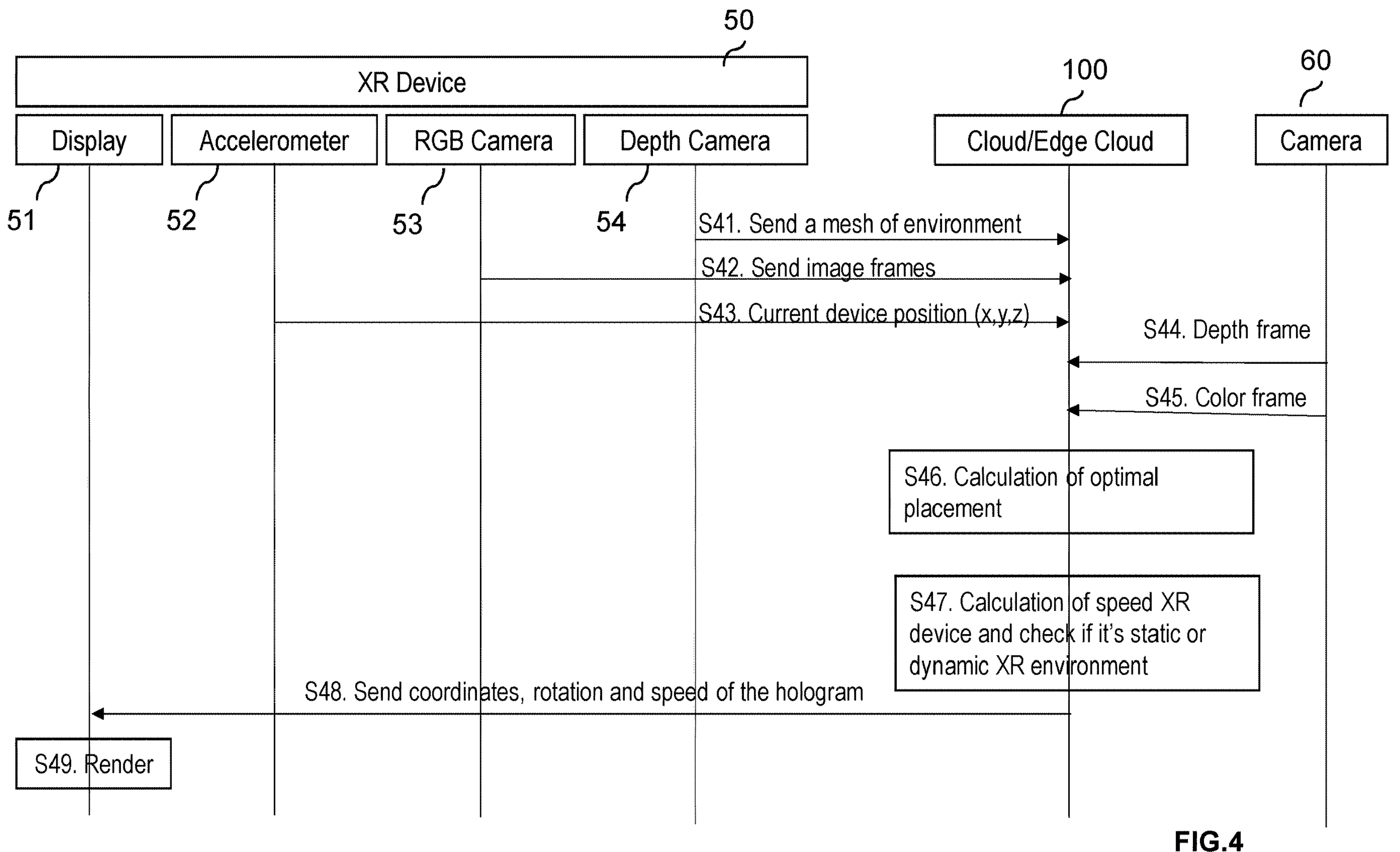
FIG. 4 shows a schematic view of a message exchange between the involved entities for placing as 3D visual appearance in a field of view of an extended reality device.

FIG. 4 now discloses the different steps carried out at the different entities in order to correctly place the visual appearance 80 at an appropriate position in the field of view of a user 70 or first participant wearing the extended reality device 50.

In Step S41 XR device 50, here the depth camera 54 sends a mesh of the environment over a network to an edge cloud 150. The cloud can represent or include a processing entity 100 distributed over the cloud 150 which carries out the steps in the cloud. The network can include a wired or wireless network (e.g. 4G, 5G). The edge cloud can be located in the network operator domain or in a public cloud outside the network. The mesh is stored in the cloud and can be enhanced by including new samples. This will help to create a precise model of a static environment.

In Step S42 XR device (e.g. the RGB camera 53) sends color frame from the RGB camera to the cloud.

In step S43, XR device 50 sends current information from accelerometer with a device position. The position could include x,y,z coordinates.

In step S44, a camera 60 located at the location of the human, the second participant in the communication (not shown) transmits a depth frame to the cloud, and in step S45 a (color) frame or any other 2D frame is sent to the could 150. The 2D camera of step S45 and 3D camera of step S44 represent a vision capturing system and can be co-located in one vision camera or may be implemented as separated entities. This applies to the rest of the application.

In step S46 the cloud is calculating an optimal placement of a hologram or 3D visual representation based on similarities in meshes, image recognition (common objects in both scenes) and environment understanding (safety zones versus forbidden areas). S46 is explained in more detail bellow.

Optionally in step S47 the cloud 150 is calculating a speed of the XR device 50. Based on the calculation the environment can be considered as mobile or static. The example of a mobile XR environment is when the user of XR device is walking and having a XR conferencing with a another person shown as 3D representation in the field of view of the XR device 50. A static conferencing scenario may be when a person (grandmother) in elderly home is watching a hologram of grandson playing with toys.

The Information regarding the optimal placement (x, y, z coordinates, rotation and speed) sends to XR device in step S48.

In step S49, XR device renders the 3D representation of the visual appearance of the human at the given position.

Figure 5:
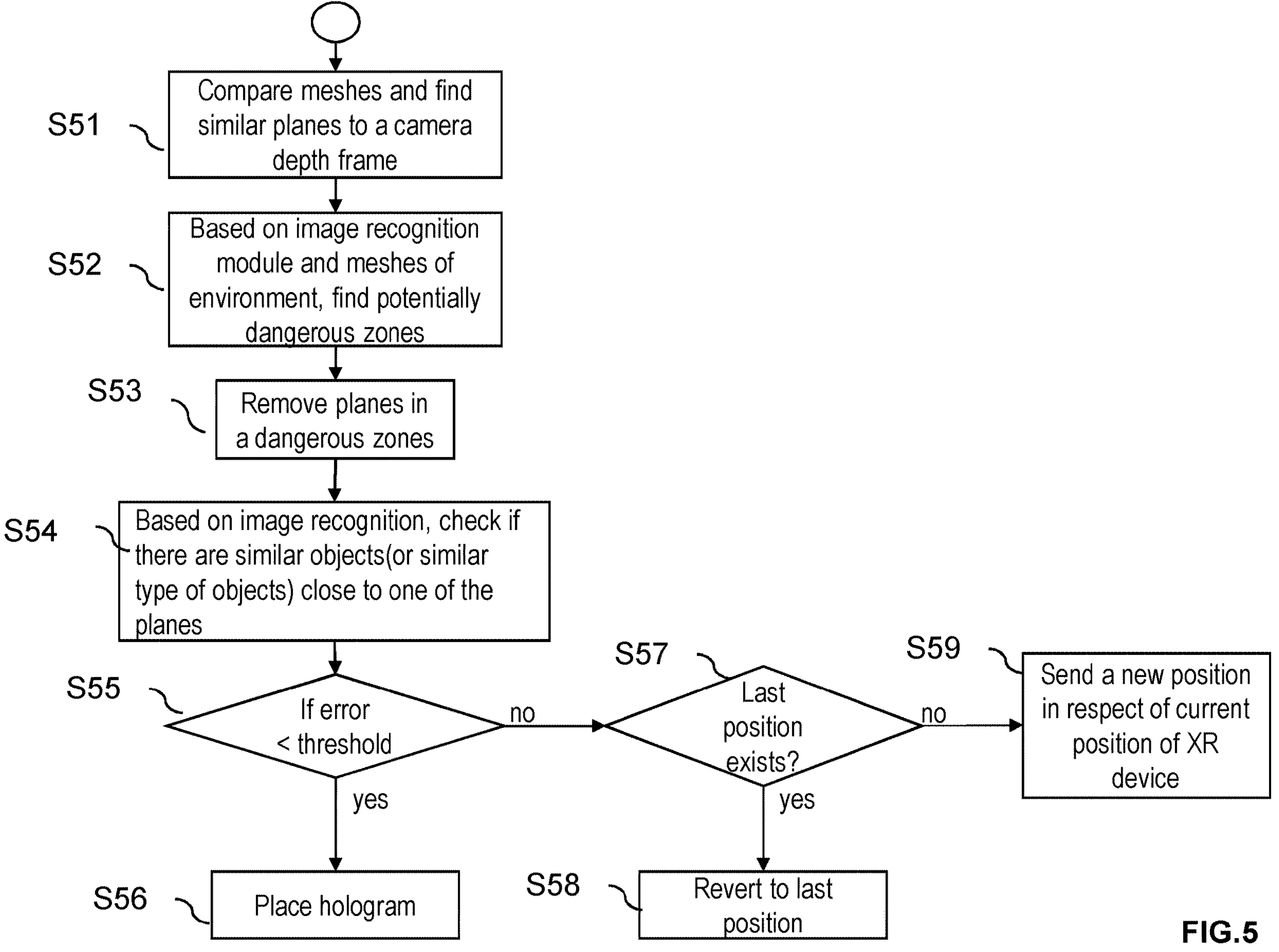
FIG. 5 shows a schematic flowchart comprising the steps carried out to correctly place the visual representation of the human in the field of view of the extended reality device.

FIG. 5 explains in more detail how the calculation of the position of the visual appearance of step S46 is carried out. In step S51 the cloud receives the mesh from the XR device 50 and the depths information from the camera 60 and compares the received information in order to find similar planes. In step S52, the different objects are recognized based on an image recognition. Based on the image recognition and the measures of the environment, potentially forbidden areas or dangerous zones are identified so that these areas can be executed for the positioning of the visual appearance. In step S53 the identified planes in the forbidden areas are removed so that no visual appearance is placed on these planes. In step S54, the different objects present in the field of view of the device 50 and the objects shown in the images received from camera 60 that were identified are compared in order to find similar objects. Preferably objects in the neighborhood of the human represented in the image received from camera 60 are identified, by way of example whether the human is standing on a certain plane or is sitting on a certain object such as a chair. The processing entity or cloud then tries to find similar planes and similar objects in the field of view of the extended reality device 50.

Figure 9:
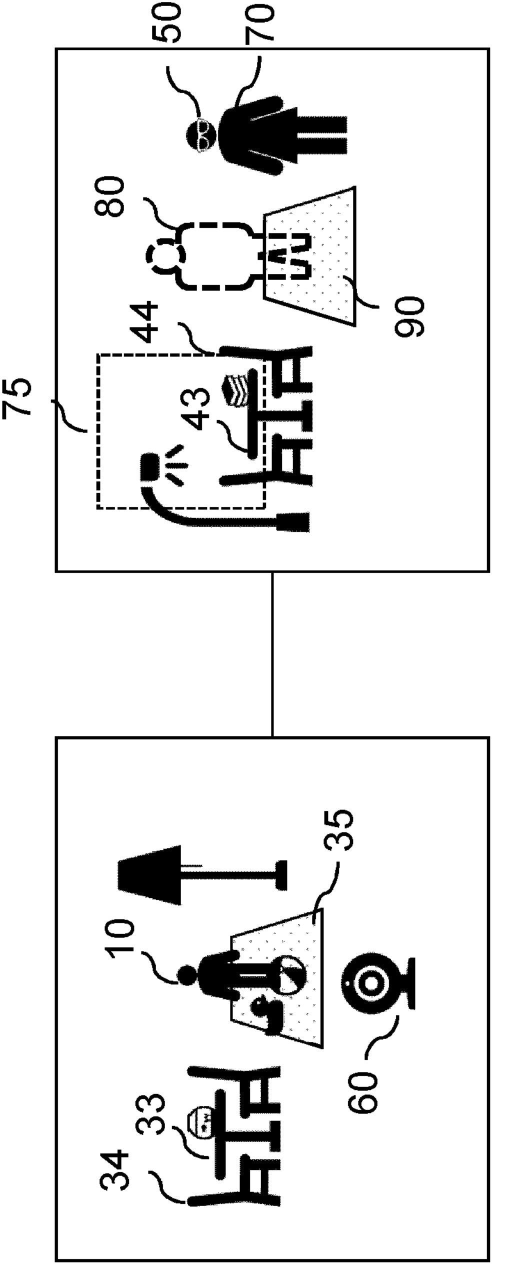
FIG. 9 shows an example application of how a visual representation of a human can be placed in the environment as seen by the user of the extended reality device.

By way of example as shown in FIG. 9, a camera 60 generates 2D and 3D images of an environment in which a human such as a child 10 is playing on a ground plane 35. In the neighborhood of the child 10 chairs 34 and a table 33 can be identified. The images of this scene are transmitted to the cloud 150 which also receives the field of view of a user 70 wearing the extended reality device 50. In an image recognition step the processing entity at the cloud identifies that in the field of view of the user 70 a table 43 is provided and chairs 44. Based on the similarities as detected by the camera 60 and the field of view of the user 70, it is possible to determine a position of the visual appearance 80. The forbidden area 75 is avoided, and a target plane 90 is identified which is located in a similar environment as the ground plane 35. The visual appearance 80 should correspond to the person or child 10. Accordingly, the user 70 can watch the child 10 playing as its visual appearance 80 is introduced into the field of view of the extended reality device 50.

Referring again to FIG. 5, step S54 includes the recognition of similar objects in the two different locations, especially objects which are close to the plane where the human or child 10 is playing and objects or planes in the field of view of the user 70. In step S55 it is then checked whether the error in the matching step of objects and the error in finding a plane similar to the plane where the human 10 is placed, is smaller than a threshold. If this is the case, the 3D representation or hologram is placed at the determined position as symbolized in FIG. 9 by the appearance 80. If however it is determined in step S55 that the error is larger than a threshold, it is checked in step S57 whether a last position exists, a position where the visual appearance has been placed in the field of view of the user 70. If this is the case the processing reverts to the last determined position in step S58. If no last position exists in step S57, it is possible to place the visual representation on any available plane which is not in one of the forbidden areas. Accordingly, a new position is determined relative to the device 50 and is sent to the device. The visual appearance, the 3D representation can be added to a place in the middle of the plane not closer than a predefined threshold value to the device 50.

Figure 6:
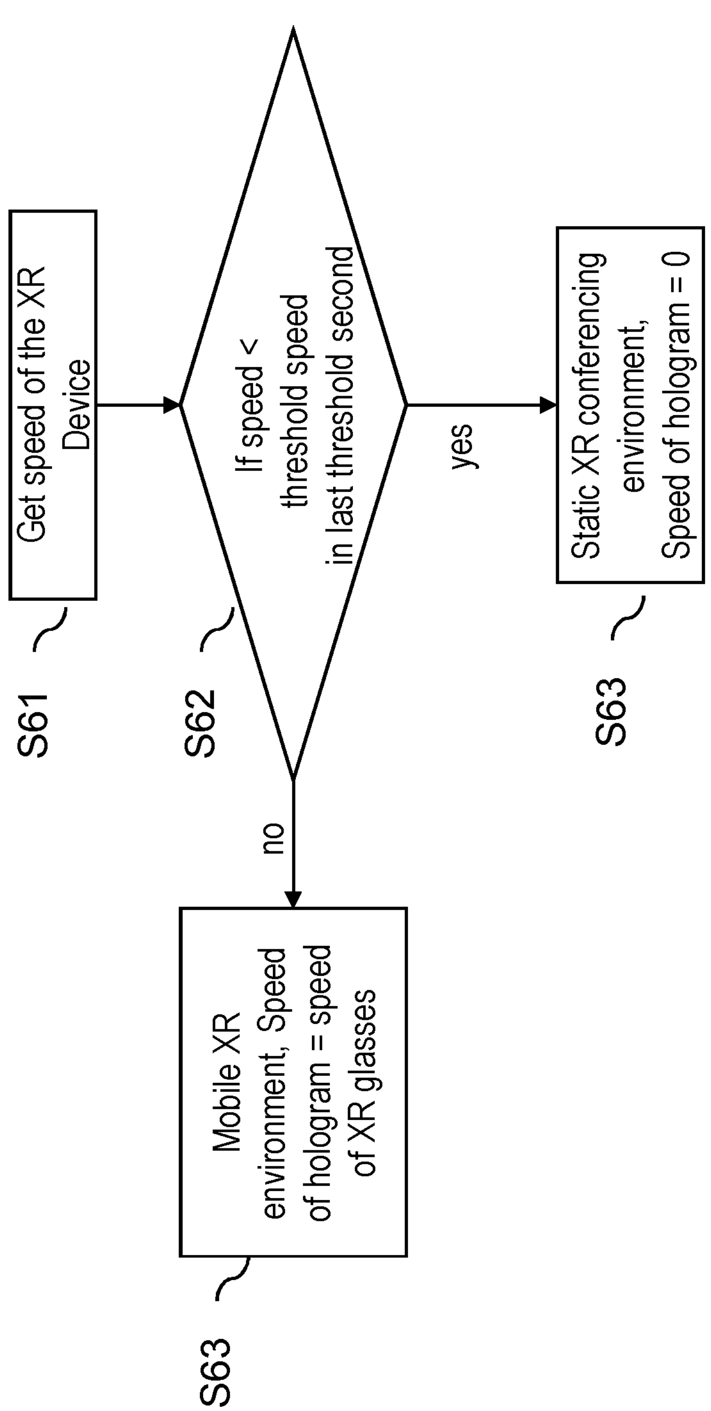
FIG. 6 shows a schematic flowchart of a method comprising the steps carried out whether the environment is a static or mobile environment.

FIG. 6 shows a further example in which the movement of the user 70 is considered. Here the speed or velocity can be determined with which the extended reality device 50 is moving. The calculation of the speed can be carried out at the extended reality device 50 or at the cloud 150. In step S61 the speed of the device 50 is determined. This is possible by using the position and the timestamps as received from the extended reality device 50. With s being the speed, the speed is determined as follows:

The distance d can be determined based on the position determined at different image frames.

$$s = d \div t$$

$$d = |(x, y, z)\ \text{coordinates}|_i - |(x, y, z)\ \text{coordinates}|_{i+1}$$

In step S62 it is determined whether the speed is smaller than a threshold speed within a certain timeframe such as one or several seconds. If the speed of the device 50 is lower than a threshold, the environment can be considered to be a static environment. By way of example if the speed of the device 50 is less than 1 km/h in the last 4 seconds, the environment is considered to be a static environment. This corresponds to step S63. If however the speed of the device 50 is higher than the threshold in the last seconds, it may be considered as a mobile environment. In another example, if the speed of the device is faster than 3 km/h in the last 4 seconds it is assumed that the user 70 and the device 50 is moving.

Figures 7, 8:
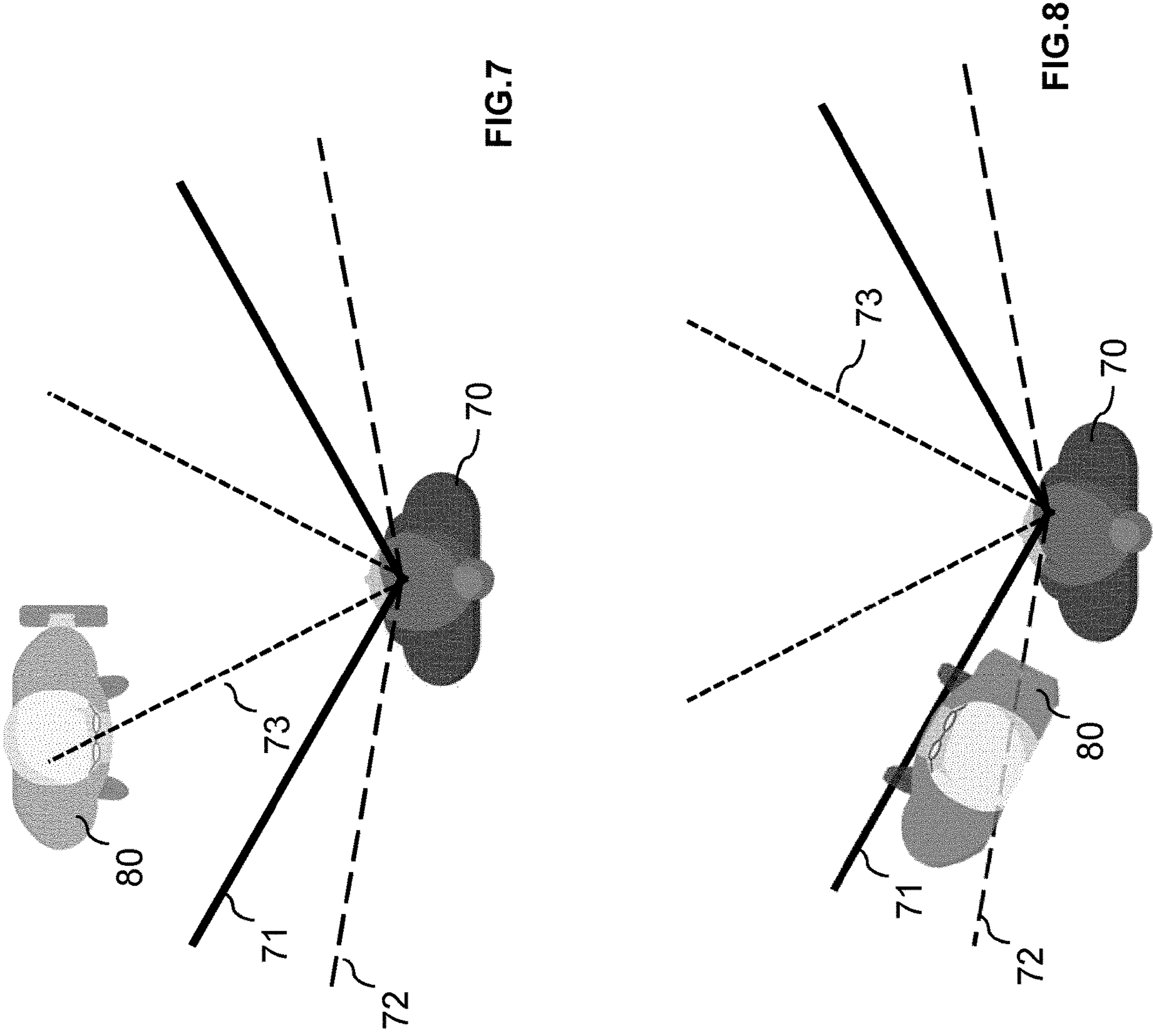
FIG. 7 shows a schematic example representation of the placement of a visual representation of the human for a static user of the extended reality device.
FIG. 8 shows a schematic example representation of the placement of a visual presentation of the human for a moving user in the extended reality device.

FIGS. 7 and 8 show how the visual appearance 80 can be positioned in dependence on the fact whether the user 70 is considered to be a static or a moving user. FIG. 7 shows the example where the user 70 is considered to be a static user so that the visual appearance 80 is positioned more or less in front inside the field of view 73 of the device 50. If however the user 70 is considered to be in a moving environment, meaning that the user is moving, the visual appearance 80 may be placed between the beginning of the peripheral or enlarged field of view 72 and the binocular field of view 71.

Figure 10:
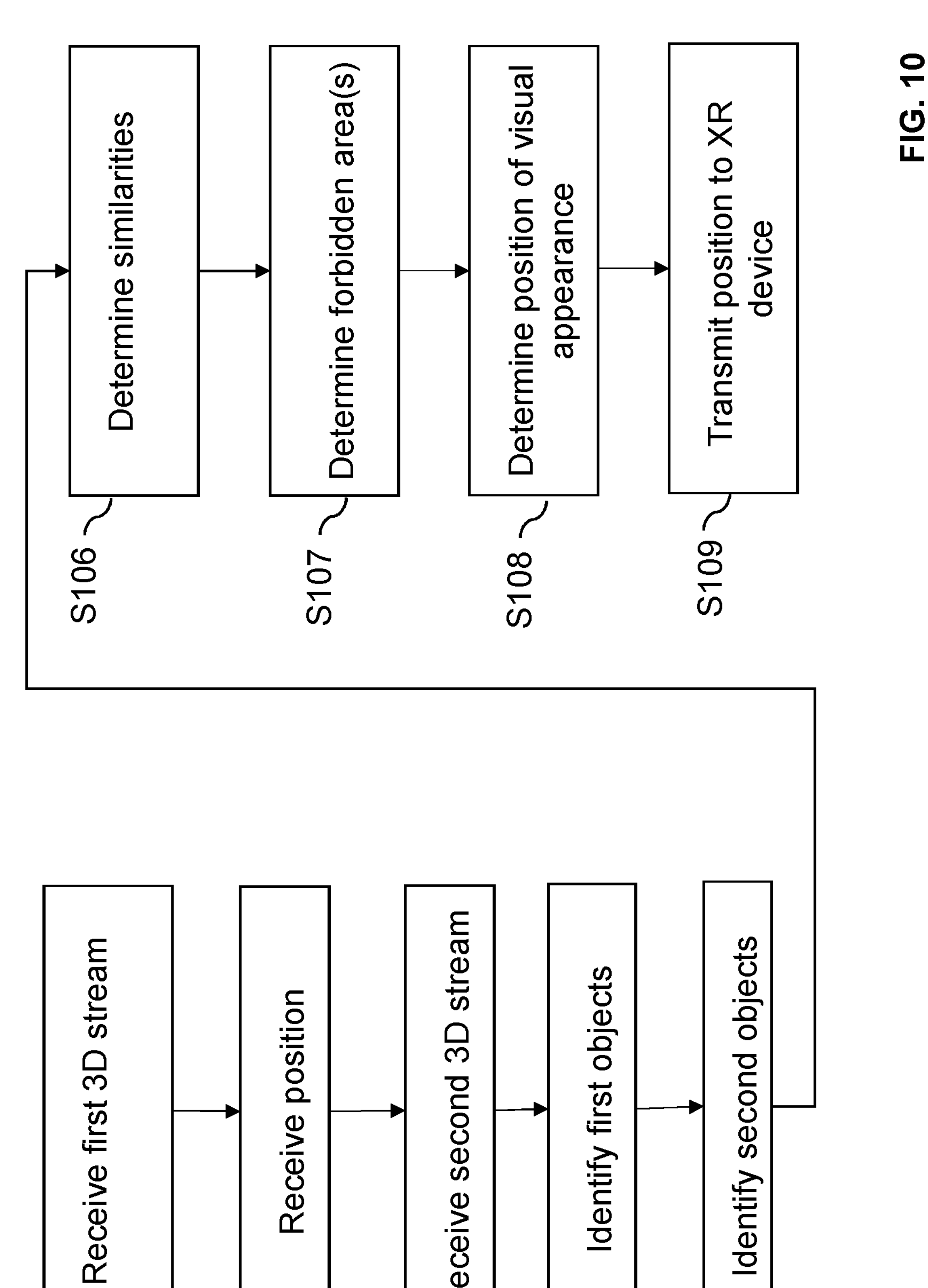
FIG. 10 shows an example flowchart of a method carried out by a processing entity determining a position of the visual representation of the human in the field of view of the extended reality device.

FIG. 10 summarizes some of the steps carried out by the processing entity in the situations discussed above. In step S101 the processing entity receives the first 3D image data stream from the extended reality device as discussed in connection with step S41 to S42. Furthermore, the position of the extended reality device is received as mentioned in step S43 (S102). In step S103 the second 3D image data stream representing the human as a second participant of the conferencing scenario is received. In step S104 objects represented in the first 3D image data streams are identified, and in step S105 objects are identified which are represented in the second 3D image data stream. Based on the identified objects it is possible in step S106 to determine the similarities between the first objects and the second objects identified in the corresponding streams. In step S107 at least one forbidden area is determined in the field of view of the first 3D image data stream where the placement of the visual appearance of the human is to be avoided. In step S108 the position of the visual appearance of the human is determined in the first 3D image data stream taking into account the similarities, the at least one forbidden area and the position of the extended reality device. In step S109 the determined position is transmitted over a communication network to the extended reality device where the visual appearance is to be included into the field of view of the first participant wearing the extended reality device.

Figure 11:
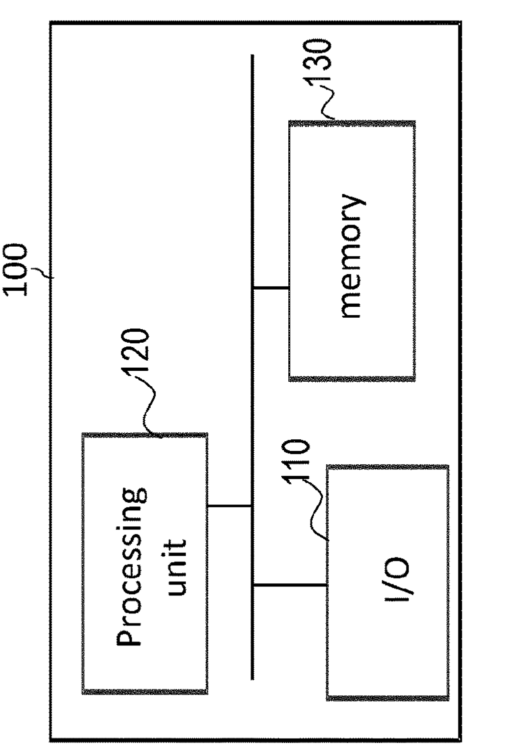
FIG. 11 shows an example schematic representation of the processing entity configured to determine the position of the visual representation.

FIG. 11 shows a schematic architectural view of the processing entity which can carry out the above discussed calculation and determination of the position of the visual appearance. As indicated, the processing entity can be implemented in a cloud environment and may be distributed over different locations. The processing hardware at the different locations or in an environment without a cloud implementation comprises an interface 110 provided for transmitting data streams or a position of a visual appearance to other entities and provided for receiving data streams or other control data from other entities. The entity 100 furthermore comprises a processing unit 120 which is responsible for the operation of the processing entity 100. The processing unit 120 can comprise one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above-described functionalities in which the processing entity is involved.

Figure 12:
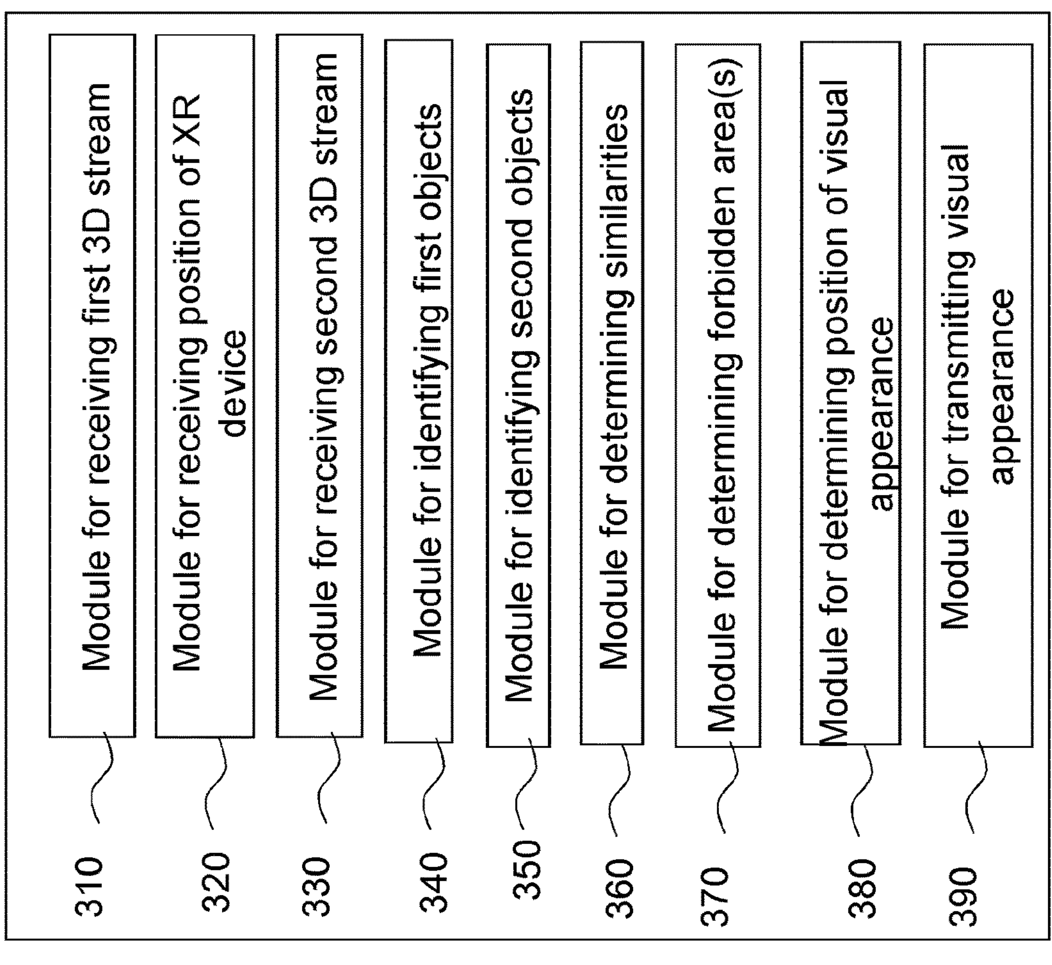
FIG. 12 shows another example schematic representation of the processing entity configured to determine the position of the visual representation.

FIG. 12 shows another schematic architectural view of the processing entity 300 comprising a first module configured to receive the 3D image data stream from the XR device, namely the first 3D stream. A second module 320 is configured to receive a position of the extended reality device. A module 330 is configured to receive the second 3D image data stream representing at least one human as the second participant of the conferencing scenario.

A module 340 identifies first objects represented in the first 3D image data stream and a module 350 identifies second objects represented in the second 3D image data stream. A module 360 is configured to determine similarities between the first objects and the second objects and a module 370 is configured to determine at least one forbidden area in the field of view of the first 3D image data stream where placement of the visual appearance of the human is to be avoided. A module 380 then determines a position of the visual appearance take into account the similarities, the at least one forbidden area and the position of the extended reality device. A module 390 is configured to transmit the determined position of the visual appearance over a communication network to the extended reality device where it is included.

From the above said some general conclusions can be drawn:

- when the second objects are identified in the second 3D image data stream, it is possible to identify a ground plane upon which the visual appearance of the human can be positioned, and a reference object located in proximity of to visual appearance may be determined. For determining the similarities it is possible to determine objects of similar type in the first and second image data streams and the position of the visual appearance is determined taking into account the identified ground plane, the reference object and the objects of similar type. In FIG. 9 the objects of similar type included the chairs and the table.

Furthermore, it is possible to determine a target plane 90 in the first 3D image data stream which is located in proximity to a target object 43, 44 in the first 3D image data stream, wherein the target object is of similar type as the reference object 33, 34 in the second 3D image data stream. The position of the visual appearance 80 is then determined by placing the visual appearance on the target plane 90 while avoiding the at least one forbidden area 75. In FIG. 9 the target plane 90 is determined as being positioned close to the reference objects, here the chairs 44 and the table 43, while it is avoided to place the visual appearance of the child 10 on table 43.

Preferably the target plane 90 where the visual appearance is to be placed is of the same type as the ground plane 35. Furthermore, it is possible to exclude planes detected in the at least one forbidden area when the target plane is determined upon which the visual appearance is to be placed.

It is possible to carry out a matching between the target object 43, 44 and the reference object 33, 34 and if an error occurring during the matching is smaller than a threshold, the visual appearance is placed at the determined position. When the error is larger than the threshold, the determined position is not used and a position determined at an earlier point in time is transmitted to the extended reality device.

Additionally, it is possible to carry out a matching between the target plane 90 and the ground plane 35 and if the error occurring during the matching is smaller than a threshold, the visual appearance is placed at the determined position. However, when the error is larger than the threshold, the determined position is not used and a position determined at a earlier point in time is transmitted to the extended reality device.

If it is determined that the error is larger than the threshold and no position has been determined at an earlier point in time, the position of the visual appearance is determined anywhere on the target plane 90 outside the at least one forbidden area 75.

Furthermore, it is possible to determine a speed by which the extended reality device is moving based on at least 2 different received positions of the extended reality device. The position of the visual appearance is then determined taking into account the determined position. This can mean that if the determined speed is slower than a threshold value, the first participant is assumed to be a static participant and if the determined speed is higher than the threshold value, the first participant is to be assumed to be a mobile participant. The determined position of the visual appearance can then depend on the fact whether the first participant is assumed to be a mobile or static first participant. This was discussed above in connection with FIGS. 7 and 8 where the visual appearance for a walking user 70 is place in a different position compared to the static user 70.

The determined position of the visual appearance may be closer to a central part of the field of view of the first participant if the first participant is assumed to be a static first participant compared to the determined position of the visual appearance if the first participant is assumed to be a mobile participant. In other words, it is possible that the determined position of visual appearance for the mobile participant is located closer to a peripheral part of the field of view compared to the determined position of the visual appearance of the participant is assumed to be a static participant. In FIG. 8, the visual appearance is located closer to the peripheral part of the FOV 72 compared to the situation shown in FIG. 7.

When the position of the visual appearance is determined, it is possible to determine the coordinates in space, a rotation in a speed of the visual appearance by which the visual appearance is moving.

The first 3D image data stream can comprise a stream of meshes generated by a 3D camera and a stream of RGB images or textures generated by a 2D camera.

The position of the visual appearance may be determined relative to a position of the extended reality device or relative to the first participant wearing the extended reality device.

The extended reality device may be an augmented reality device or a mixed reality device. Furthermore, it is possible that the determined position is transmitted together with the second image data stream.

In the solution discussed above the placement of the visual appearance occurs with an understanding of the environment and based on the comparison between measures and image recognition. This allows the placement of the 3D representation or the visual appearance inside the extended reality device in an appropriate context. This 3D representation be replaced in a zone which is considered as safe by the user of the extended reality device. Furthermore, the solution discussed above is device agnostic as there is no dependency on the XR device or camera. This is obtained as a spatial mapping is used together with image recognition methods.

The invention claimed is:

1. A method for processing 3D image data streams comprising at a processing entity in an audio-visual conferencing scenario:

receiving, from an extended reality device, a first 3D image data stream representing a field of view of a first participant wearing the extended reality device, receiving a position of the extended reality device, receiving a second 3D image data stream representing at least one human representing at least a second participant, identifying first objects represented in the first 3D image data stream, identifying second objects represented in the second 3D image data stream, determining similarities between the first objects and the second objects, determining at least one forbidden area in the field of view of the first 3D image data stream, where a placement of a visual appearance of the human is to be avoided, determining a position of the visual appearance of the human in the first 3D image data stream taking into account the similarities, the at least one forbidden area and the position of the extended reality device, transmitting the determined position of the visual appearance over a communication network to the extended reality device where the visual appearance is to be included into the field of view of the first participant, wherein the visual appearance, as a 3D representation based on the first 3D image data stream and the second 3D image data stream, is added to a place in middle of a ground plane not closer than a predefined threshold value to the extended reality device.

2. The method of claim 1 wherein determining second objects comprises identifying the ground plane upon which at least one human is positioned and a reference object located in proximity to at least one human, wherein determining similarities comprises determining objects of similar type in the first and second 3D image data streams, wherein the position of the visual appearance is determined taking into account the identified ground plane, the reference object and the objects of similar type.

3. The method of claim 2, wherein a target plane is determined in the first 3D image data stream which is located in proximity to a target object in the first 3D image data stream, with the target object being of similar type as the reference object in the second 3D image data stream, wherein the position of the visual appearance is determined by placing the visual appearance on the target plane while avoiding the at least one forbidden area.

4. The method of claim 3, wherein the target plane is of the same type as the ground plane.

5. The method of claim 3, wherein planes detected in the at least one forbidden area are excluded when the target plane is determined.

6. The method of claim 3, wherein a matching is carried out between the target object and the reference object wherein if an error occurring during the matching is smaller than a threshold, the visual appearance is placed at the determined position, wherein when the error is larger than the threshold, the determined position is not used and a position determined at an earlier point in time is transmitted to the extended reality device.

7. The method of claim 6, wherein if the error is larger than the threshold and no position has been determined at an earlier point in time, the position of the visual appearance is determined anywhere on the target plane outside the at least one forbidden area.

8. The method of claim 3, wherein a matching is carried out between the target plane and the ground plane, and if an error occurring during the matching is smaller than a threshold, the visual appearance is placed at the determined position, wherein when the error is larger than the threshold, the determined position is not used and a position determined at an earlier point in time is transmitted to the extended reality device.

9. The method of claim 1 further comprising the step of determining a speed by which the extended reality device is moving based on at least 2 different received positions of the extended reality device, wherein the position of the visual appearance is determined taking into account the determined speed.

10. The method of claim 9, wherein if the determined speed is lower than a threshold value the first participant is assumed to be a static first participant, and if the determined speed is higher than the threshold value the first participant is assumed to be a mobile first participant, wherein the determined position of the visual appearance depends on the fact whether the first participant is assumed to be a mobile or static first participant.

11. The method of claim 10, wherein the determined position of the visual appearance is closer to a central part of the field of view of the first participant if the first participant is assumed to be a static first participant compared to the determined position of the visual appearance if the first participant is assumed to be a mobile first participant.

12. The method of claim 10, wherein the determined position of the visual appearance for the mobile first participant is located closer to a peripheral part of the field of view compared to the determined position of the visual appearance if the first participant is assumed to be a static first participant.

13. The method of claim 1, wherein determining the position comprises determining coordinates in space, a rotation and a speed of visual appearance by which the visual appearance is moving.

14. The method of claim 1 wherein the first 3D image data stream comprises a stream of meshes generated by a 3D camera and a stream of RGB images or textures generated by a 2D camera.

15. The method of claim 1, wherein the position of the visual appearance is determined relative to a position of the extended reality device or relative to the first participant wearing the extended reality device.

16. The method of claim 1, wherein the extended reality device comprises at least one of an augmented reality device and a mixed reality device.

17. The method of claim 1, wherein the determined position is transmitted with the second 3D image data stream.

18. A processing entity configured to processing 3D image data streams in an audio-visual conferencing scenario, wherein the processing entity comprising:

one or more processors; and a memory configured to store instructions which when executed by the one or more processors causes the processing entity:

receive, from an extended reality device, a first 3D image data stream representing a field of view of a first participant wearing the extended reality device, receive a position of the extended reality device, receive a second 3D image data stream representing at least one human representing at least a second participant, identify first objects represented in the first 3D image data stream, identify second objects represented in the second 3D image data stream, determine similarities between the first objects and the second objects, determine at least one forbidden area in the field of view of the first 3D image data stream, where a placement of a visual appearance of the human is to be avoided, determine a position of a visual appearance of the human in the first 3D image data stream taking into account the similarities, the at least one forbidden area and the position of the extended reality device, transmit the determined position of the visual appearance over a communication network to the extended reality device where the visual appearance is to be included into the field of view of the first participant, wherein the visual appearance, as a 3D representation based on the first 3D image data stream and the second 3D image data stream, is added to a place in middle of a ground plane not closer than a predefined threshold value to the extended reality device.

19. The processing entity of claim 18, further being operative, for determining second objects, to identify a ground plane upon which the visual appearance of the human is positioned and a reference object located in proximity to the visual appearance, an operative, for determining similarities, to determine objects of similar type in the first and second 3D image data streams, and to determine the position of the visual appearance taking into account the identified ground plane, the reference object and the objects of similar type.

20. The processing entity of claim 19, further being operative to determine a target plane in the first 3D image data stream which is located in proximity to a target object in the first 3D image data stream, with the target object being of similar type as the reference object in the second 3D image data stream, and to determine the position of the visual appearance by placing the visual appearance on the target plane while avoiding the at least one forbidden area.

* * * * *